United States Patent
Deguchi

(10) Patent No.: US 10,005,142 B2
(45) Date of Patent: Jun. 26, 2018

(54) CUTTING INSERT, CUTTING TOOL, AND METHOD OF PRODUCING MACHINED PRODUCT

(71) Applicant: KYOCERA Corporation, Kyoto-shi, Kyoto (JP)

(72) Inventor: Shin Deguchi, Moriyama (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 276 days.

(21) Appl. No.: 14/443,419

(22) PCT Filed: Nov. 27, 2013

(86) PCT No.: PCT/JP2013/081892
§ 371 (c)(1),
(2) Date: May 18, 2015

(87) PCT Pub. No.: WO2014/084254
PCT Pub. Date: Jun. 5, 2014

(65) Prior Publication Data
US 2015/0298226 A1    Oct. 22, 2015
US 2016/0129507 A9    May 12, 2016

(30) Foreign Application Priority Data

Nov. 27, 2012    (JP) .................. 2012-258928

(51) Int. Cl.
*B23C 5/20*    (2006.01)
*B23C 5/22*    (2006.01)
*B23C 5/10*    (2006.01)

(52) U.S. Cl.
CPC .............. *B23C 5/205* (2013.01); *B23C 5/109* (2013.01); *B23C 5/20* (2013.01); *B23C 5/2217* (2013.01);
(Continued)

(58) Field of Classification Search
CPC ......... B23C 5/205; B23C 5/25; B23C 5/2217; B23C 5/109; B23C 2200/087;
(Continued)

(56) References Cited

U.S. PATENT DOCUMENTS 3,947,937 A * 4/1976 Hertel .................. B23B 27/143
407/114
4,880,338 A * 11/1989 Stashko ................ B23B 27/143
407/114
(Continued)

FOREIGN PATENT DOCUMENTS

CA    2464639 A1 * 10/2004 ........... B23C 5/2213
CN    102548694 A    7/2012
(Continued)

OTHER PUBLICATIONS

JP 11-347826 (Translation) obtained at https://dossier1.j-platpat.inpit.go.jp/tri/all/odse/ODSE_GM101_Top.action (last visited May 16, 2017).*
(Continued)

*Primary Examiner* — Ryan Rufo
(74) *Attorney, Agent, or Firm* — Volpe and Koenig, P.C.

(57) ABSTRACT

A cutting insert according to an embodiment of the present invention has an upper surface, a lower surface, a side surface connected to each of the upper surface and the lower surface, and a cutting edge located along an intersection of the upper surface and the side surface. The upper surface has a land surface disposed along the cutting edge, a rake surface which is located further inside than the land surface and is inclined so as to have a smaller height as departing from the land surface, and a bottom surface located further inside than the rake surface. The rake surface has a projection-shaped first region and a concave-shaped second region which are alternately disposed along the bottom surface. The first
(Continued)

region has a first recess that reaches the second region adjacent to the first region.

7 Claims, 16 Drawing Sheets

(52) U.S. Cl.
CPC .. *B23C 2200/045* (2013.01); *B23C 2200/081* (2013.01); *B23C 2200/087* (2013.01); *B23C 2200/326* (2013.01)

(58) Field of Classification Search
CPC ........ B23C 2200/326; B23C 2200/045; B23C 5/20; Y10T 407/235; B23B 2200/087
See application file for complete search history.

(56) References Cited

U.S. PATENT DOCUMENTS

| | | | | |
|---|---|---|---|---|
| 5,772,365 A | * | 6/1998 | Vogel | .................... B23C 5/1045 407/114 |
| 5,807,031 A | * | 9/1998 | Arai | ........................ B23C 5/202 407/113 |
| 5,934,844 A | | 8/1999 | Woolley | |
| 6,079,912 A | * | 6/2000 | Rothballer | ............ B23C 5/2213 407/114 |
| 2006/0216122 A1 | * | 9/2006 | Engstrom | ............... B23C 5/202 407/114 |
| 2008/0175677 A1 | | 7/2008 | Prichard et al. | |
| 2008/0304924 A1 | * | 12/2008 | Engstrom | ............... B23C 5/202 407/114 |
| 2010/0166514 A1 | * | 7/2010 | Okumura | ................ B23B 51/02 408/1 BD |
| 2012/0189396 A1 | | 7/2012 | Xu | |

FOREIGN PATENT DOCUMENTS

| | | |
|---|---|---|
| EP | 0932468 A1 | 8/1999 |
| JP | 06-179111 A | 6/1994 |
| JP | 11-347826 A | 12/1999 |
| JP | 2006-082168 A | 3/2006 |
| JP | 2010-516483 A | 5/2010 |
| JP | 2013-031923 A | 2/2013 |
| WO | 98/16341 A1 | 4/1998 |
| WO | 2008/088628 A1 | 7/2008 |
| WO | 2013/088698 A1 | 6/2013 |

OTHER PUBLICATIONS

Extended European Search Report, European Patent Application No. 13858790.2, dated Mar. 14, 2016, 7 pgs.
International Search Report, PCT/JP2013/081892, dated Dec. 24, 2013, 1 pg.
Chinese Office Action with English concise explanation, Chinese Patent Application No. 201380060654.7, dated Feb. 24, 2016, 10 pgs.

* cited by examiner

CUTTING INSERT, CUTTING TOOL, AND METHOD OF PRODUCING MACHINED PRODUCT

TECHNICAL FIELD

The present invention relates to a cutting insert, a cutting tool, and a method of producing a machined product.

BACKGROUND ART

A milling insert described in Japanese Unexamined Patent Publication No. 2013-31923 (Patent Document 1) has conventionally been known as a cutting insert for use in a cutting process of a workpiece that becomes a machined product. The milling insert described in Patent Document 1 has a cutting region (cutting edge) along the intersection of an upper surface and a side surface, and a plurality of recesses for supplying a cooling fluid (coolant) to the upper surface.

In the milling insert described in Patent Document 1, the portion of the intersection of the upper surface and the side surface which is located outside the recesses is apt to be cooled by the cooling fluid. However, the portion of the intersection of the upper surface and the side surface which is located outside the region between the recesses adjacent to each other is less apt to be cooled by the cooling fluid. Therefore, cooling efficiency in the entirety of the cutting edge can deteriorate when a wide range of the intersection of the upper surface and the side surface is used as the cutting edge.

SUMMARY OF THE INVENTION

A cutting insert according to an embodiment of the present invention has an upper surface, a lower surface, a side surface connected to each of the upper surface and the lower surface, and a cutting edge located along an intersection of the upper surface and the side surface. The upper surface has a land surface disposed along the cutting edge, a rake surface which is located further inside than the land surface and is inclined so as to have a smaller height as departing from the land surface, and a bottom surface located further inside than the rake surface. The rake surface has a plurality of first regions and a plurality of second regions which are alternately disposed along the bottom surface. The plurality of second regions have a larger inclination angle than the plurality of first regions and are concave areas on the rake surface. The first region has a first recess disposed along the cutting edge.

EMBODIMENTS FOR CARRYING OUT THE INVENTION

Figure 1:
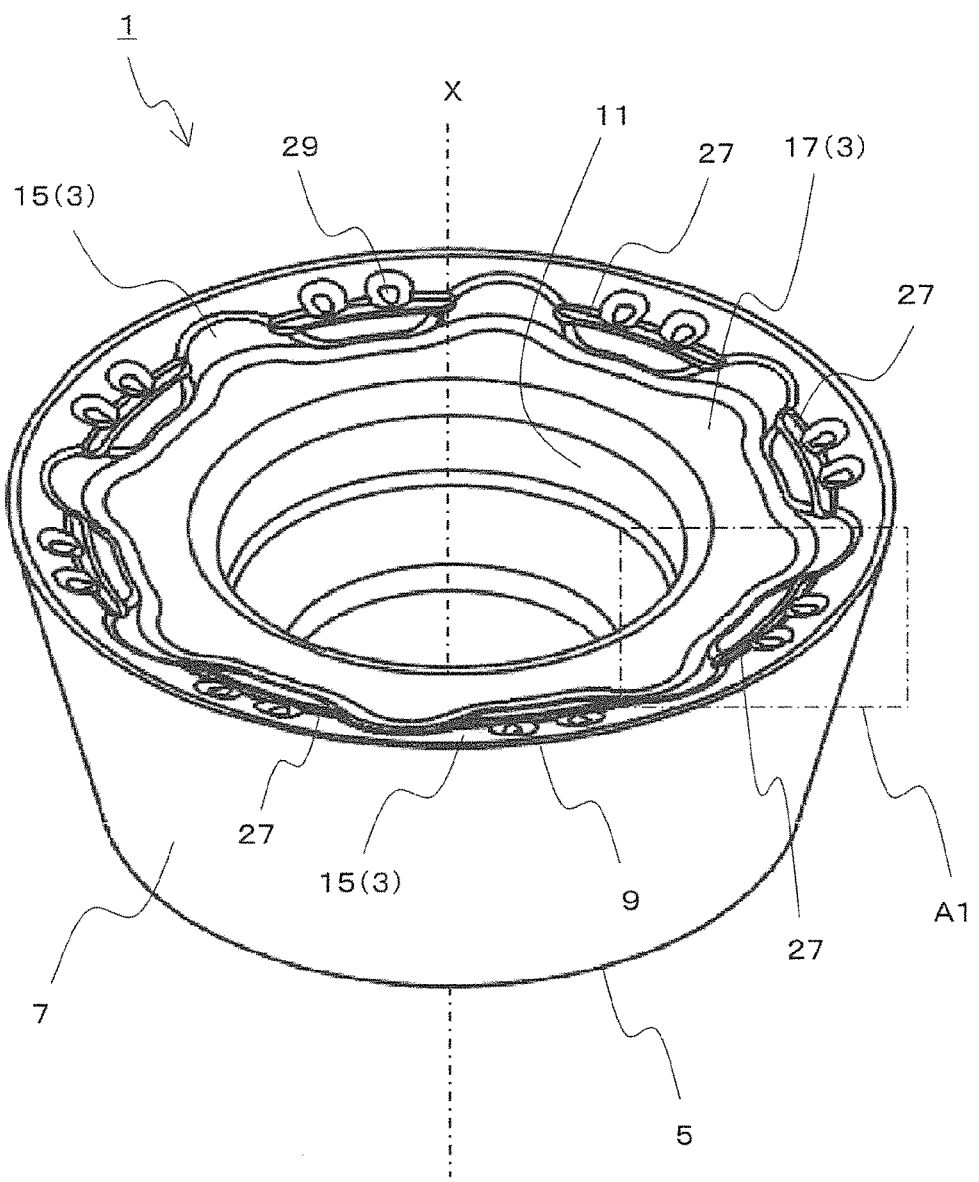
FIG. 1 is a perspective view showing a cutting insert according to an embodiment of the present invention.

A cutting insert of an embodiment is described in detail below with reference to the drawings. For the sake of convenience in the description, the drawings referred to in the following show, in simplified form, only major elements among components of the embodiment which are necessary for describing the present invention. Therefore, the cutting insert of the present invention may have any optional component not shown in these drawings referred to in the present specification. The sizes of the components in these drawings are not faithful to the actual sizes of the components and to the actual size ratio of the components.

As shown in FIGS. 1 to 8, the cutting insert 1 of the present embodiment has an upper surface 3, a lower surface 5, and a side surface 7. The side surface 7 is connected to each of the upper surface 3 and the lower surface 5. A cutting edge 9 is formed along an intersection of the upper surface 3 and the side surface 7. The cutting insert 1 of the present embodiment has a central axis X passing through a center of the lower surface 5 and a center of the upper surface 3. The cutting insert 1 also has a through hole 11 that opens to a central portion of the upper surface 3 and a central portion of the lower surface 5. Therefore, the through hole 11 is located so as to include the central axis X, and a penetrating direction of the through hole 11 is parallel to the central axis X. The through hole 11 is disposed to insert a screw therein when the cutting insert 1 is screwed into a holder of a cutting tool described later.

The upper surface 3 and the lower surface 5 have an approximately circular shape and are of approximately identical shape in their respective plan views (top views). The lower surface 5 is smaller than the upper surface 3. Therefore, the side surface 7 is inclined so as to approach the central axis X from a portion of the side surface 7 which is connected to the upper surface 3 toward a portion of the side surface 7 which is connected to the lower surface 5 in a side view.

The upper surface 3 and the lower surface 5 in the cutting insert 1 of the present embodiment have a maximum width of 5 to 20 mm. The height between the lower surface 5 and the upper surface 3 is 2 to 8 mm. Here, the maximum width of the upper surface 3 denotes a maximum value of the width of the upper surface 3 in the top view. Specifically, the diameter of a virtual circumscribed circle with respect to the upper surface 3 is the maximum width. The maximum width of the upper surface 3 is indicated by width L in FIG. 3. Similarly, a maximum value of the width of the lower surface 5 denotes a maximum value of the width of the lower surface 5 in a bottom view. Specifically, the diameter of a virtual circumscribed circle with respect to the lower surface 5 is the maximum width. The height between the lower surface 5 and the upper surface 3 denotes a height between the upper end of the upper surface 3 and the lower end of the lower surface 5 in a direction parallel to the central axis X.

The shapes of the upper surface 3 and the lower surface 5 are not limited to the above embodiment. For example, the shape of the upper surface 3 in the top view may be a polygonal shape, such as triangle, quadrangle, pentagon, hexagon, or octagon. Even when including a curvilinear portion, it is not limited to a circular arc shape. Alternatively, a projected curve that is projected outwardly, such as a parabola or elliptic curve, may be employed.

For example, cemented carbide or cermet is usable as a material of the cutting insert 1. Examples of the composition of cemented carbide include WC—Co produced by adding cobalt (Co) powder to tungsten carbide (WC), followed by sintering, WC—TiC—Co produced by adding titanium carbide (TiC) to WC—Co, and WC—TiC—TaC—Co produced by adding tantalum carbide (TaC) to WC—TiC—Co. The cermet is a sintered composite material obtained by compositing metal, with a ceramic ingredient. Specifically, the sintered composite material is composed mainly of a titanium compound, such as titanium carbide (TiC) or titanium nitride (TiN).

The surface of the cutting insert 1 may be coated with a film by chemical vapor deposition (CVD) method or physical vapor deposition (PVD) method. Examples of the composition of the film include titanium carbide (TiC), titanium nitride (TiN), titanium carbonitride (TiCN), and alumina ($Al_2O_3$).

Figure 2:
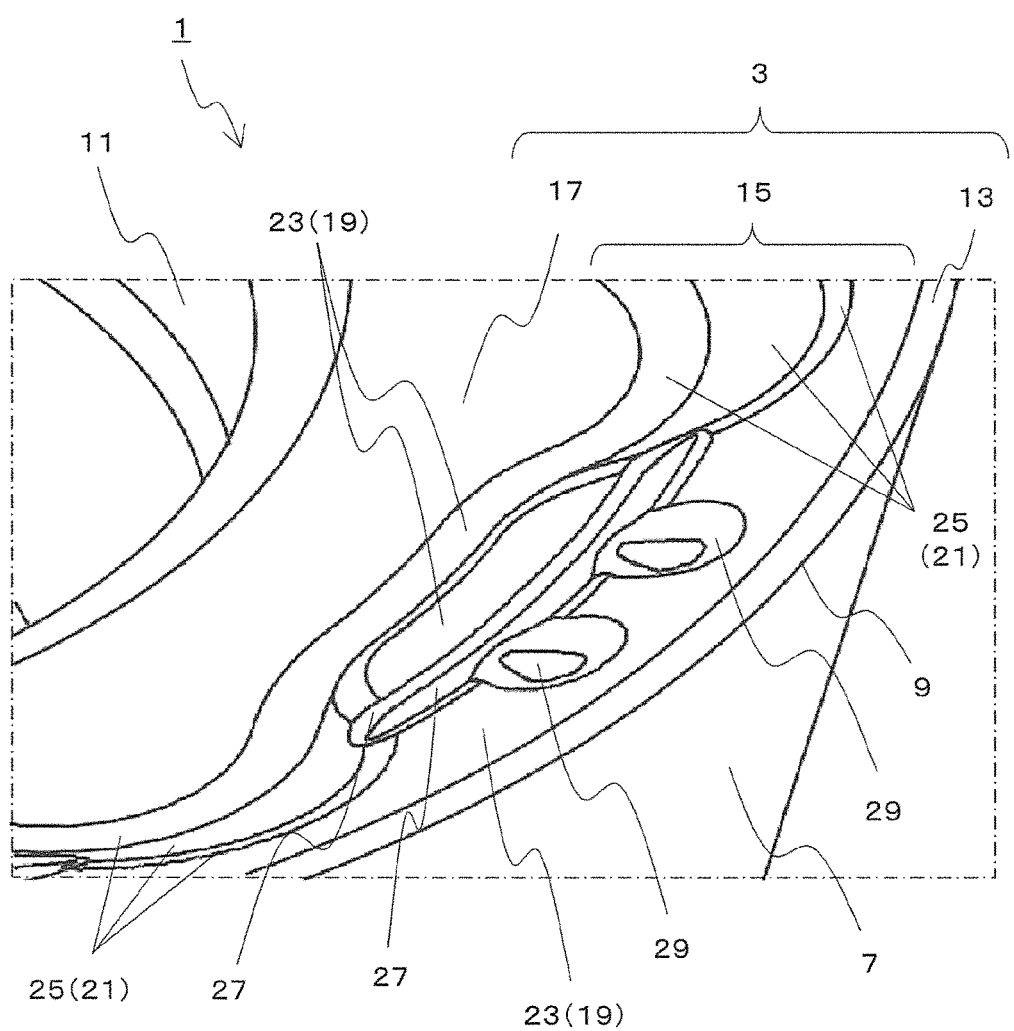
FIG. 2 is an enlarged view of an area A1 in the cutting insert shown in FIG. 1.

As shown in FIG. 2, the upper surface 3 has a land surface 13, a rake surface 15, and a bottom surface 17. The land surface 13 is disposed along the cutting edge 9. That is, the land surface 13 is located along the outer periphery of the upper surface 3 and is connected to the cutting edge 9.

The cutting edge 9 is formed along an intersection of the land surface 13 and the side surface 7. The land surface 13 is disposed to enhance the strength of the cutting edge 9. In the absence of the land surface 13, the cutting edge 9 is to be formed along an intersection of the rake surface 15 and the side surface 7. The rake surface 15 located further inside than the land surface 13 is the inclined surface whose height decreases toward the center as described above. An inclination angle of the rake surface 15 is larger than an inclination angle of the land surface 13.

That is, the strength of the cutting edge 9 can be enhanced by having the land surface 13 with the inclination angle smaller than the inclination angle of the rake surface 15. The term "inclination angle" denotes an angle formed by a straight line orthogonal to the central axis X in a section including the central axis X and a target surface. The width of the land surface 13, which is indicated by the distance between the outer periphery of the upper surface 3 and the outer periphery of the rake surface 15, is properly set according to cutting conditions, for example, in the range of 1 mm or less.

The rate surface 15 is located further inside than the land surface 13. The rake surface 15 has a role in scooping chips generated during the cutting process using the cutting edge 9. Therefore, the chips of a workpiece flow along a surface of the rake surface 15. The rake surface 15 is inclined so that the height thereof from the lower surface 5 decreases as departing from the land surface 13, in order to satisfactorily scoop the chips. In other words, in the cutting insert 1 of the present embodiment, the rake surface 15 is the inclined surface whose height decreases toward the center of the upper surface 3. The width of the rake surface 15, which is indicated by a distance between the outer periphery of the rake surface 15 and an inner periphery of the rake surface 15 in the top view, is properly set according to cutting conditions.

Figure 3:
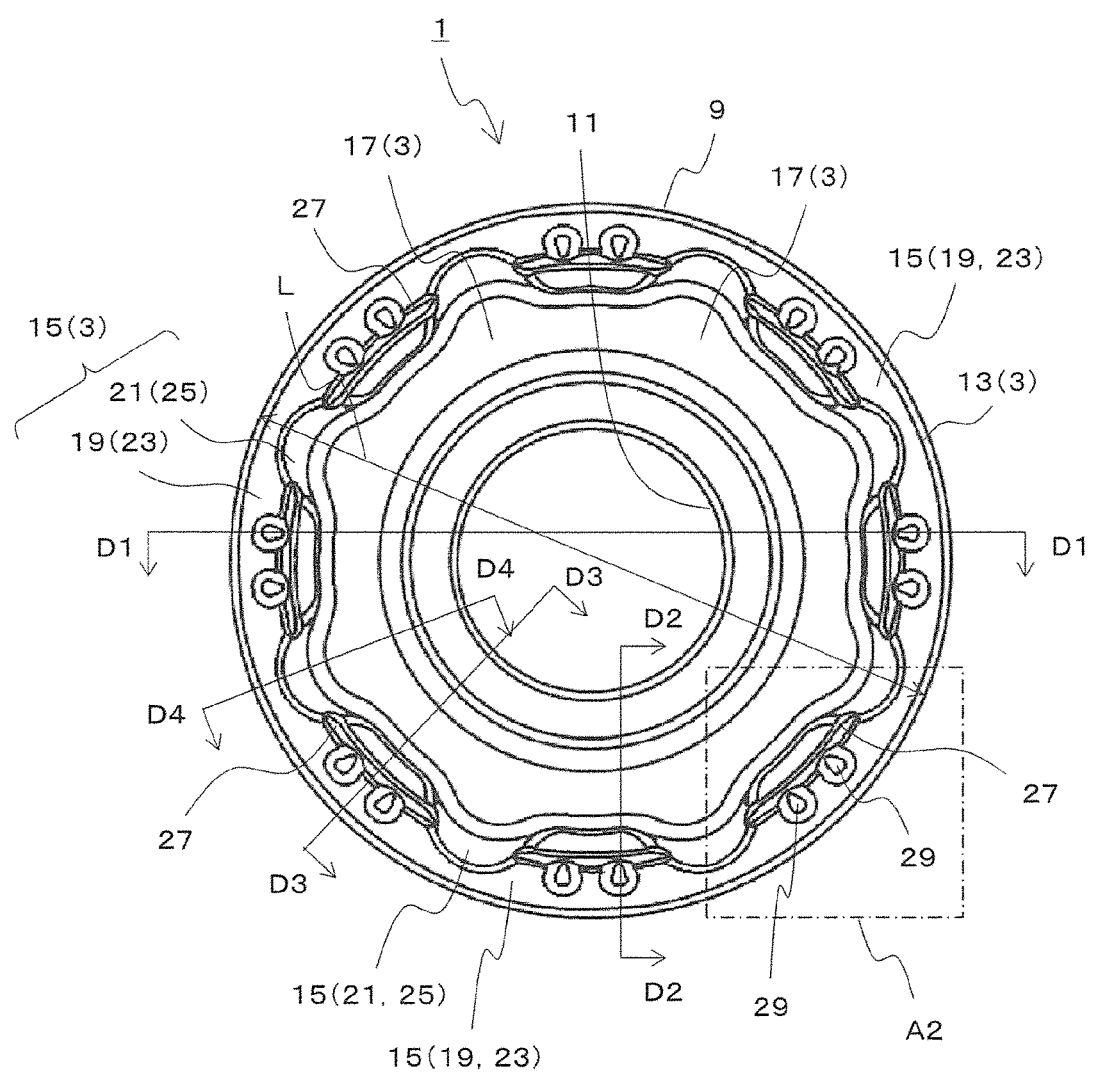
FIG. 3 is a top view of the cutting insert shown in FIG. 1.
Figure 4:
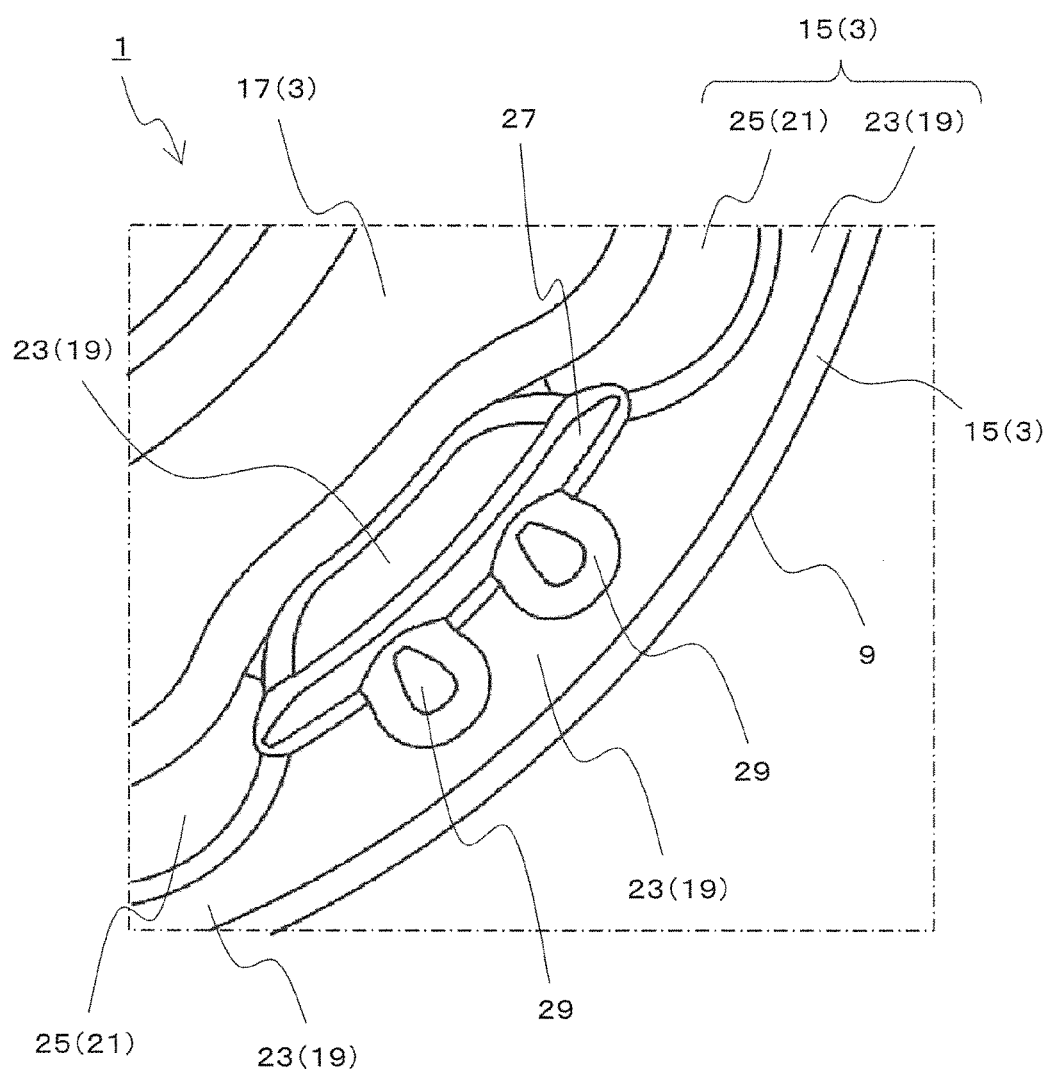
FIG. 4 is an enlarged view of an area A2 in the cutting insert shown in FIG. 3.
Figure 5:
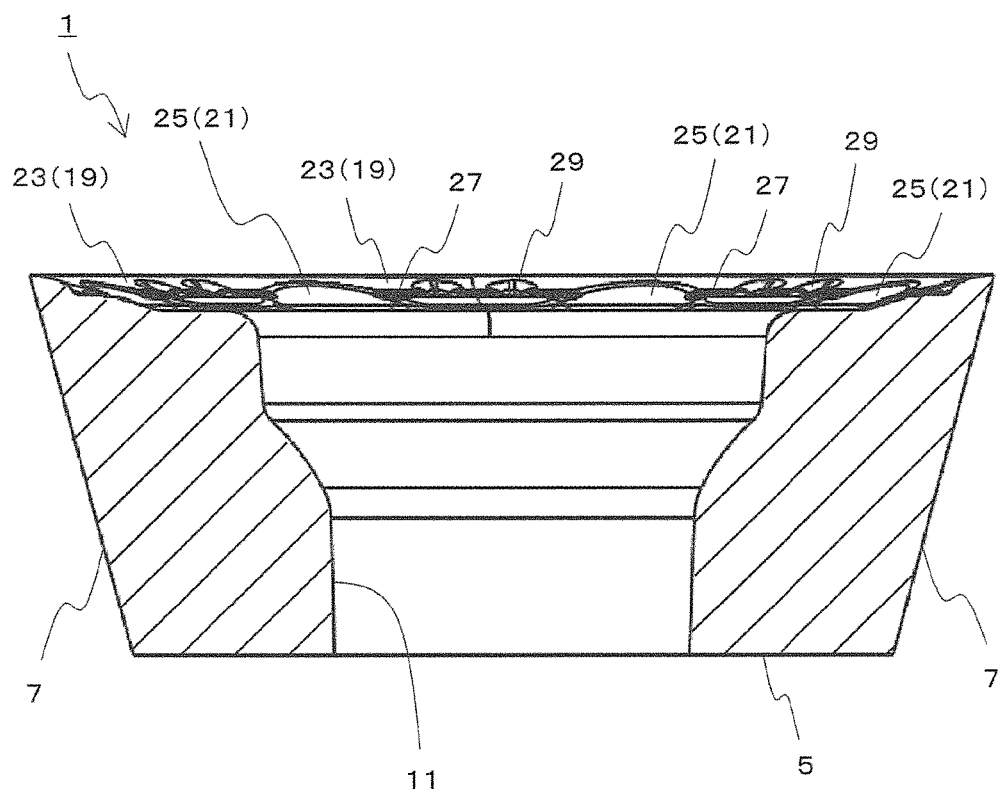
FIG. 5 is a sectional view taken along section line D1-D1 in the cutting insert shown in FIG. 3.

As shown in FIGS. 3 and 4, the rake surface 15 in the present embodiment has a first rake surface 19 disposed along the land surface 13, and a second rake surface 21 located further inside than the first rake surface 19. That is, the second rake surface 21 is located between the first rake surface 19 and the bottom surface 17. An inclination angle of the second rake surface 21 is larger than an inclination angle of the first rake surface 19.

Specifically, the inclination angle of the first rake surface 19 and the inclination angle of the second rake surface 21 are respectively kept constant in the present embodiment. This ensures such a shape that a part of the rake surface 15 formed by a constant inclination angle is partially cut out at regular intervals along the bottom surface 17.

That is, the cut out portions constitute the second rake surface 21, and the portions of the rake surface 15 except for the portions constituting the second rake surface 21 constitute the first rake surface 19. Since the inclination angle of the first rake surface 19 and the inclination angle of the second rake surface 21 are respectively kept constant, a portion of the rake surface 15 in which the inclination angle is changed can be determined as a boundary between the first rake surface 19 and the second rake surface 21.

Further in the cutting insert 1 of the present embodiment, a distance between an inner periphery of the first rake surface 19 and the outer periphery of the upper surface 3 is periodically increased or decreased in the top view. That is, the inner periphery of the first rake surface 19 is corrugated in reference to the outer periphery of the upper surface 3. The inner periphery of the first rake surface 19 may be rephrased as a boundary between the first rake surface 19 and the second rake surface 21, the bottom surface 17.

The second rake surface 21 is disposed at a valley portion of the corrugation along the inner periphery of the first rake surface 19. Similarly to the inner periphery of the first rake surface 19, a boundary between the bottom surface 17 and the entirety of the rake surface 15 constituted by the first rake surface 19 and the second rake surface 21 is corrugated in reference to the outer periphery of the upper surface 3 in the top view.

Here, portions having a large distance between the outer periphery of the upper surface 3 and the inner periphery of the first rake surface 19 are taken as "mountain" portions of the corrugation in the first rake surface 19. Portions having a small distance between the outer periphery of the upper surface 3 and the inner periphery of the first rake surface 19 are taken as "valley" portions of the corrugation in the first rake surface 19.

Assuming that a region constituted by the mountain portions of the corrugation in the first rake surface 19 is a first region 23 and a region constituted by the second rake surface 21 is a second region 25, it can be said that the rake surface 15 has a plurality of the first regions 23 and a plurality of the second regions 25 which are alternately disposed along the bottom surface 17. Here, the inclination angle of the second rake surface 21 is larger than the inclination angle of the first rake surface 19. Hence, the plurality of second regions 25 have a larger inclination angle than the plurality of first regions 23, and are concave regions on the rake surface in the cutting insert of the present embodiment.

Although the cutting insert 1 of the present embodiment has eight first regions 23 and eight second regions 25, the number of the first regions 23 and the number of the second regions 25 are not limited to eight, but there is no problem even if it may be, for example, three, four, five, or six.

Thus, the rake surface 15 has the plurality of first regions 23 and the plurality of second regions 25, thereby making it possible to reduce the possibility that chips contact with the second regions 25 while contacting with the first regions 23 during a cutting process of a workplace 201. That is, it is possible to reduce the contact area of the chips on the rake surface 15, thereby reducing the amount of heat generated by the chips grazing along the rake surface 15. Additionally, the surface area of the rake surface 15 can be increased to facilitate heat transfer from the rake surface 15.

When performing the cutting process using a cooling fluid (coolant), owing to the second regions 25 whose inclination angle is relatively large, it is easy to allow the cooling fluid to stay in the second regions 25. This facilitates cooling of the cutting insert 1 by the cooling fluid. The entirety of the inner periphery of the rake surface 15 is not formed by the second regions 25, but the rake surface 15 has the plurality of first regions 23 and the plurality of second regions 25 which are alternately disposed along the bottom surface 17. This suppresses excessive deterioration in the strength of the cutting edge 9.

The inclination angles of the first rake surface 19 and the second rake surface 21 are indicated by an angle formed by the lower surface 5 and the rake surface 15 in their respective sections perpendicular to the rake surface 15. In the insert 1 of the present embodiment, the inclination angles can also be measured by an angle formed by the lower surface 5 and the rake surface 15 in the section including the central axis X. The inclination angle of the first rake surface 19 may be set in the range of, for example, 50° or less. The inclination angle of the second rake surface 21 may be set in the range of, for example, 70° or less so as to be larger than the inclination angle of the first rake surface 19.

The inclination angle of the first rake surface 19 and the inclination angle of the second rake surface 21 in the present embodiment are respectively kept constant. However, the rake surface 15 just needs to have the first regions 23 of a projecting shape and the second regions 25 of a recessed shape which are alternately disposed along the bottom surface 17. Therefore, the first rake surface 19 and the second rake surface 21 may be respectively constituted by a plurality of areas having different inclination angles in a sectional view. Alternatively, a lower end of the first rake surface 19 and a lower end of the second rake surface 21 may be partially made into a recessed curve shape in order to ensure that the first rake surface 19 and the second rake surface 21 are smoothly connected to the bottom surface 17.

The bottom surface 17 is located further inside than the rake surface 15. The bottom surface 17 of the cutting insert 1 in the present embodiment is a flat surface perpendicular to the central axis X. Therefore, a boundary between the bottom surface 17 and the rake surface 15 corresponding to the inner periphery of the rake surface 15 can be determined by a boundary between an area of the upper surface 3 which is inclined correspondingly to the rake surface 15 and a flat area perpendicular to the central axis X which corresponds to the bottoms surface 17.

An opening of the through hole 11 which is close to the upper surface is located at a middle part of the bottom surface 17. Although the upper surface 3 in the present embodiment is constituted by the land surface 13, the rake surface 15, and the bottom surface 17, the upper surface 3 is not limited to this configuration. For example, the bottom surface 17 may have, on the inside thereof, a breaker surface inclined so that the height from the lower surface 5 increases as departing from the land surface 13.

Further in the cutting insert 1 of the present embodiment, as shown in FIGS. 3 to 8, each of the first regions 23 on the rake surface 15 has a first recess 27 disposed along the cutting edge 3. Owing to the configuration that the cooling fluid easily stays in the second region 25, a portion of the cutting edge 9 which is located outside the second region 25 can be efficiently cooled. On the other hand, there is a possibility that cooling efficiency is insufficient in a portion of the cutting edge 9 which is located outside the first region 23.

However, the first recess 27 disposed along the cutting edge 3 is formed on the first region 23, and hence the flow of the cooling fluid is congested by the first recess 27, making it easier for the cooling fluid to stay there. Consequently, the portion of the cutting edge 9 which is located outside the first region 23 can also be cooled efficiently, thus ensuring that the entirety of the cutting edge 9 is cooled stably.

Figure 6:
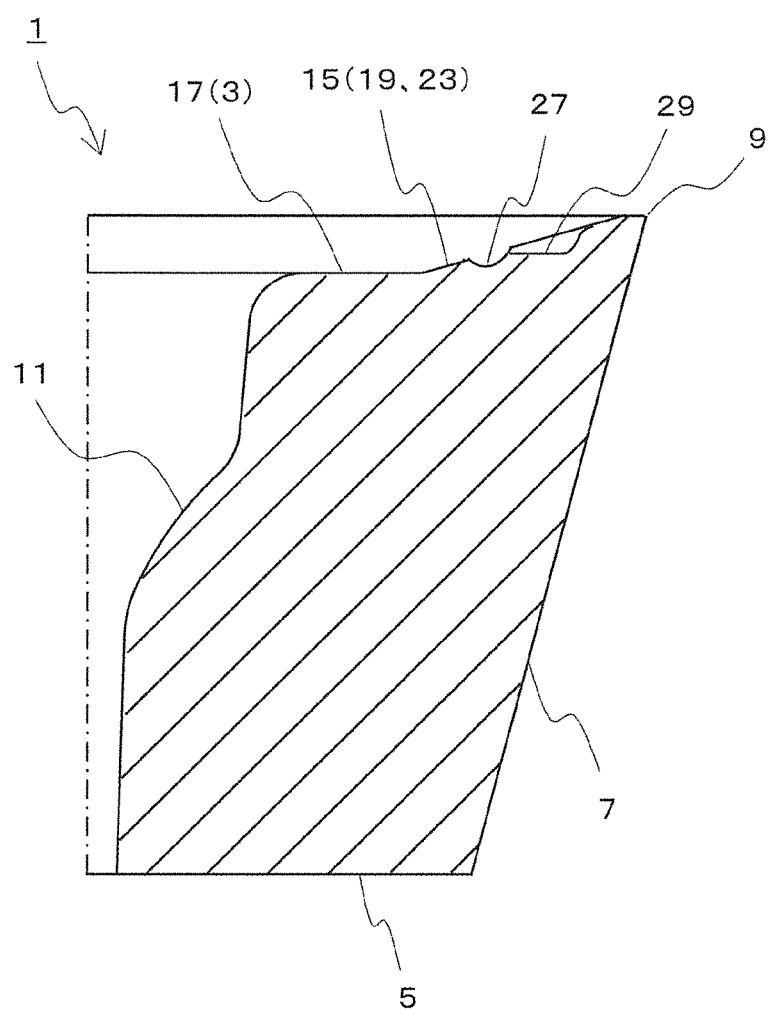
FIG. 6 is a sectional view taken along section line D2-D2 in the cutting insert shown in FIG. 3.
Figure 7:
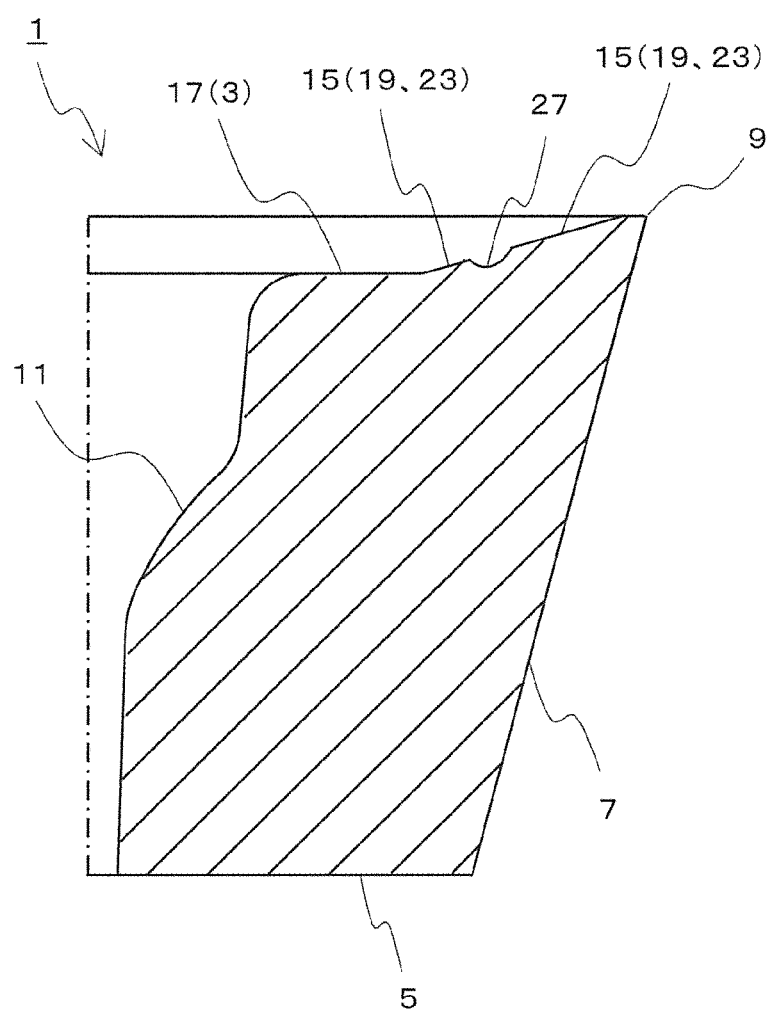
FIG. 7 is a sectional view taken along section line D3-D3 in the cutting insert shown in FIG. 3.
Figure 8:
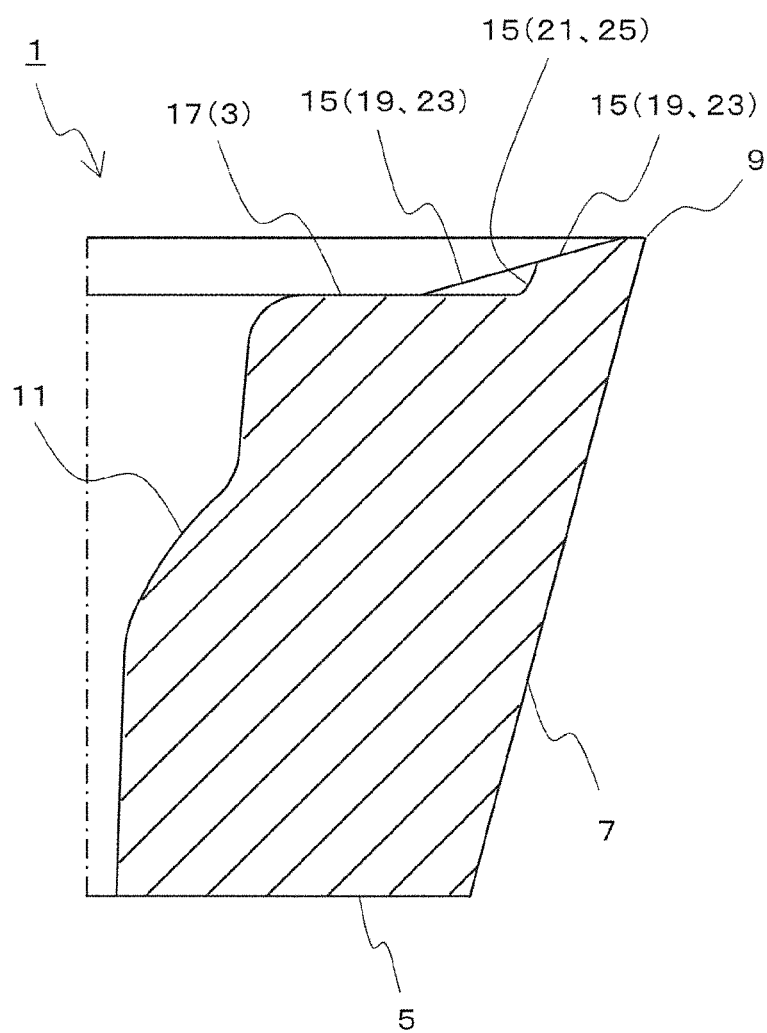
FIG. 8 is a sectional view taken along section line D4-D4 in the cutting insert shown in FIG. 3.

The sectional views shown in FIGS. 5 to 8 are respectively taken along a section parallel to the central axis X. In FIGS. 6 to 8, for the purpose of easy understanding of the shape of the rake surface in the sectional view, the illustration of a detailed shape of the rake surface except for the area thereof in the section is omitted.

Figure 9:
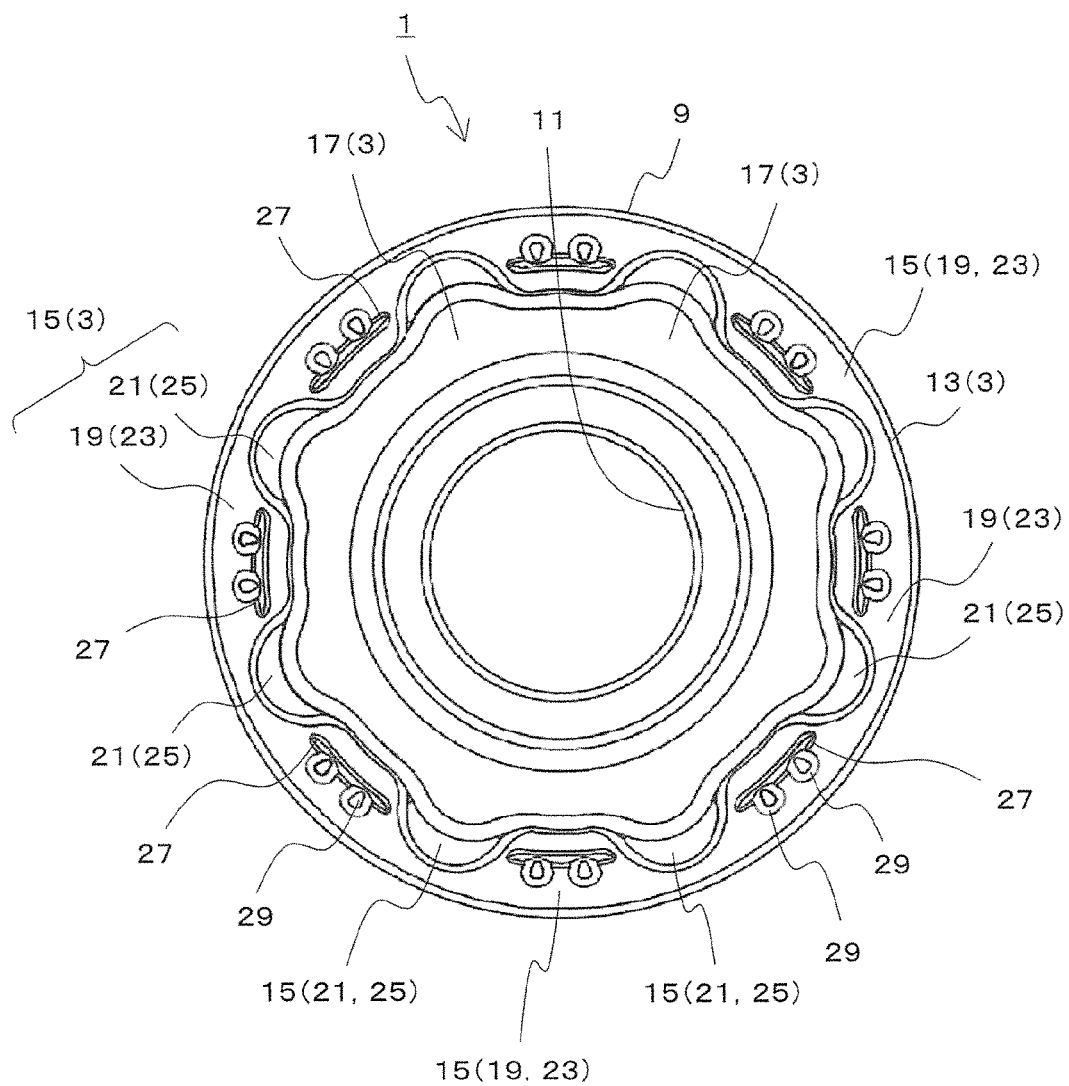
FIG. 9 is a perspective view showing a first modification of the cutting insert shown in FIG. 3.

In the cutting insert 1 of the present embodiment, the first recess 27 reaches each of a pair of second regions 25 adjacent to the first recess 27. However, the first recess 27 only needs to be disposed along the cutting edge 9. Accordingly, for example, the first recess 27 may not reach the second regions 25 as shown in FIG. 9. In an alternative embodiment, one end portion of the first recess 27 may reach the second region 25 and the other end portion thereof may be located inside the first region 23. In another embodiment, only the other end portion may reach the second region 25.

In order to efficiently cool the entirety of the portion of the cutting edge 9 which is located outside the first region 23, the first recess 27 reaches each of the pair of second regions 25 adjacent thereto as in the cutting insert 1 of the present embodiment. The first recess 27 may measure, for example, approximately 0.2 to 2 mm in width and approximately 0.05 to 0.6 mm in depth. The term "width" denotes a width in a direction orthogonal to the direction along the cutting edge 9 in the top view.

Further in the cutting insert 1 of the present embodiment, the first region 23 has, besides the first recess 27, a plurality of second recesses 29 which are respectively connected to the first recess 27 and are located between the land surface 13 and the first recess 27. The case of having at least one of these second recesses 29 ensures more efficient cooling over a wide range of the area of the first region 23 than the case of having the single first recess 27. The cooling effect owing to the cooling fluid can be further enhanced by having a plurality of the second recesses 29. The second recess 29 may measure, for example, approximately 0.2 to 1 mm in width and approximately 0.05 to 0.6 mm in depth.

Figure 10:
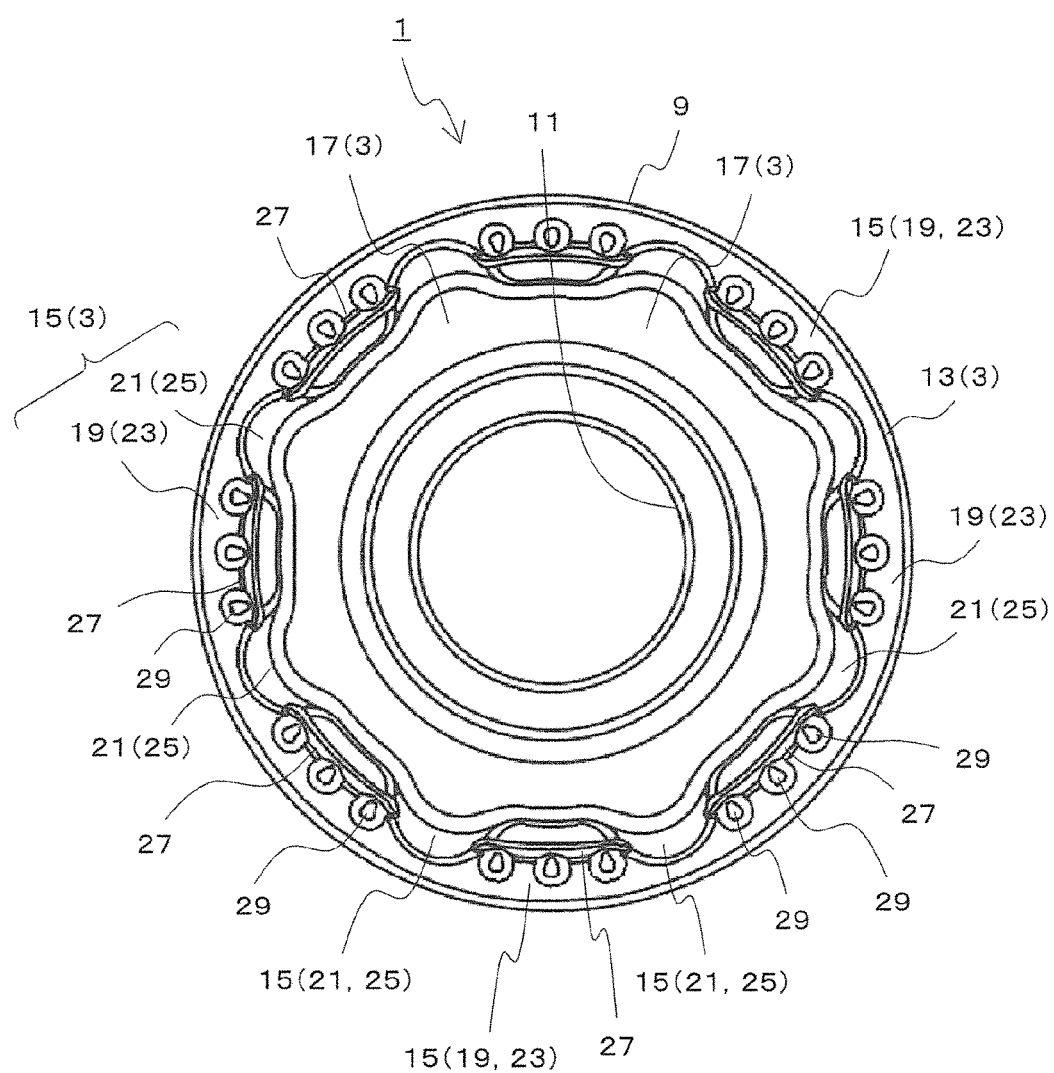
FIG. 10 is a perspective view showing a second modification of the cutting insert shown in FIG. 3.

Although the two second recesses 29 are disposed for the single first recess 27 in the embodiment shown in FIG. 3, the number of the second recesses 29 is not limited thereto. For example, three second recesses 29 may be disposed for the single first recess 27 as shown in FIG. 10.

A portion of the rake surface 15 which is closer to the land surface 13 is prone to generate a large amount of heat during the cutting process. Therefore, when the second recess 29 extends from the first recess 27 to the land surface 13, it is possible to efficiently cool the portion susceptible to the large amount of heat. Additionally, the second recess 29 is formed along a chip flow direction, thereby reducing the possibility that the chip flow is inhibited by the second recess 29.

The heat generated on the land surface 13 can be released with higher efficiency as the front end of the second recess 29 is closer to the land surface 13. However, the durability of the land surface 13 might be lowered. Hence, the second recess 29 is preferably away from the land surface 13, and the distance between the land surface 13 and the second recess 29 may be set to be approximately 0.2 to 1 mm.

Here, the width of the second recess 29 is preferably increased as going from the first recess 27 to the land surface 13 as in the present embodiment. As described earlier, the portion of the rake surface 15 closer to the land surface 13 is prone to generate the large amount of heat. Owing to a relatively large width of the portion of the second recess 29 which is close to the land surface 13, it is possible to efficiently cool the portion susceptible to the large amount of heat. The term "width" as used in the above denotes a width in a direction orthogonal to the direction from the first recess 27 to the land surface 13 in the top view.

Figure 11:
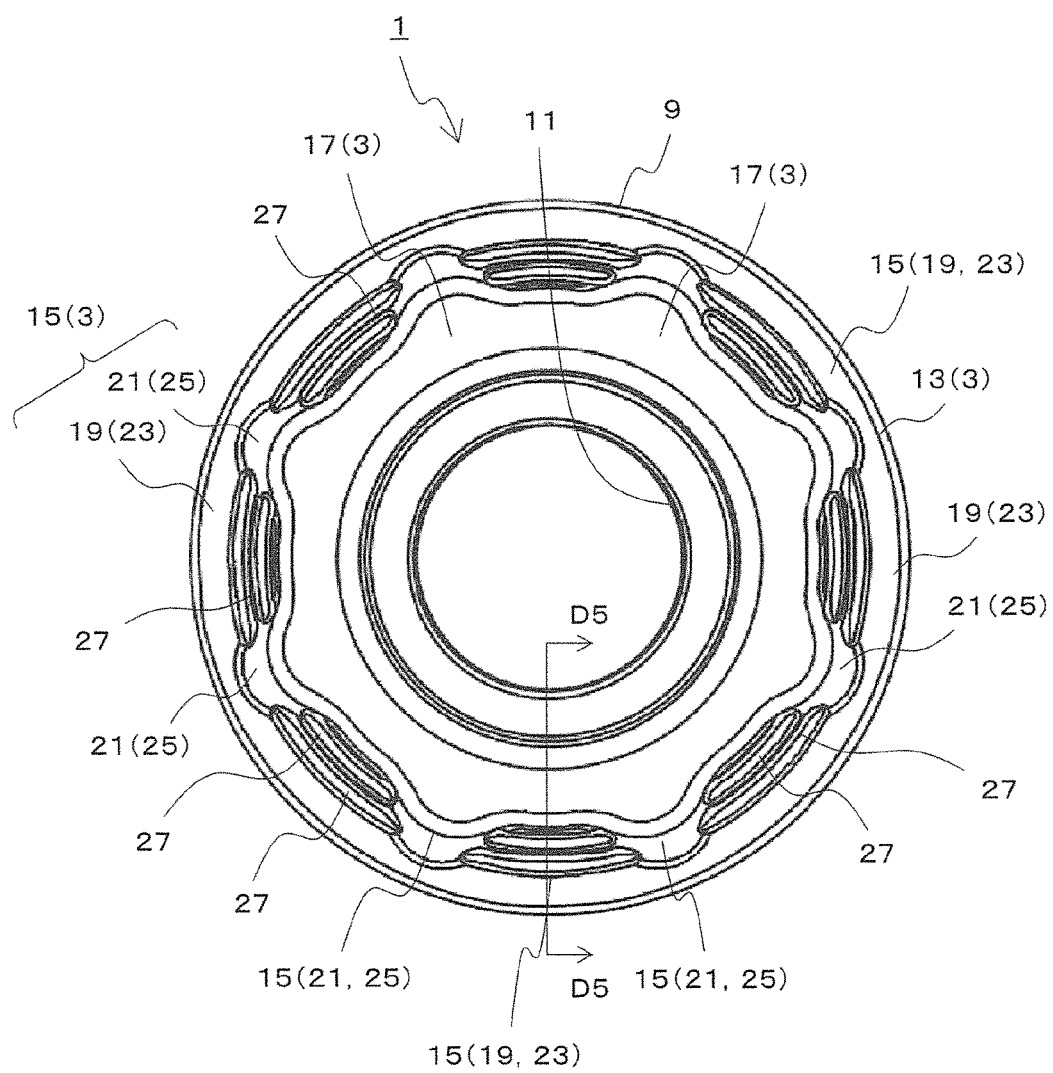
FIG. 11 is a perspective view showing a third modification of the cutting insert shown in FIG. 3.
Figure 12:
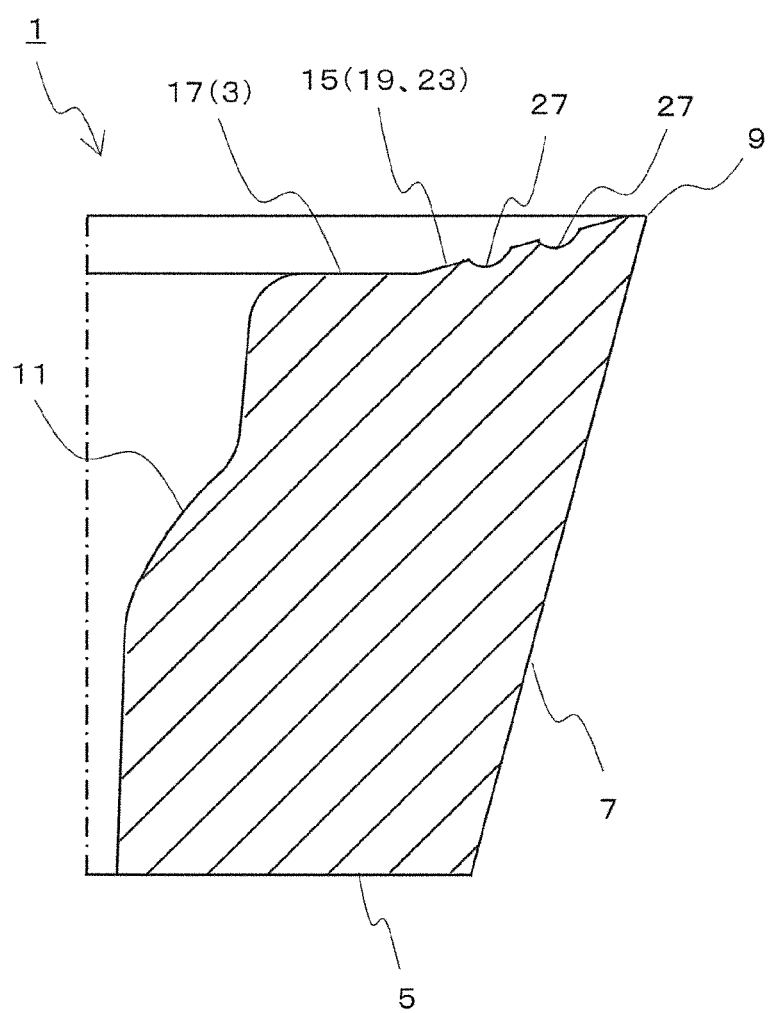
FIG. 12 is a sectional view taken along section line D5-D5 in the cutting insert shown in FIG. 11.

Although the cutting insert 1 shown in FIG. 3 has the single first recess 27, the cutting insert 1 is not limited thereto. For example, the cutting insert 1 may have a plurality of the first recesses 27 as shown in FIGS. 11 and 12. The sectional view shown in FIG. 12 is taken along a section parallel to the central axis X. For the purpose of easy understanding of the shape of the rake surface 15 in the sectional view, the illustration of a detailed shape of the rake surface 15 except for the area thereof in the section is omitted in FIG. 12.

The cutting edge 9 is formed along the intersection of the upper surface 3 and the side surface 7. The upper surface 3 has an approximately circular shape and hence the cutting edge 9 has an annular shape in the cutting insert 1 of the present embodiment. The cutting insert 1 of the present embodiment has the eight first regions 23 and the eight second regions 25. When the cutting process is continued for a long time by using an area of the cutting edge 9 corresponding to the first region 23 and the second region 25 adjacent to each other, and consequently the area is deteriorated, a different area of the cutting edge 9 may be used.

That is, after the cutting insert 1 is temporarily removed from the holder, the cutting insert 1 is to be rotated 45° with respect to the central axis X and then reattached to the holder. A different area of the cutting edge 9 corresponding to the first region 23 and the second region 25, except for the foregoing first and second regions 23 and 25 adjacent to each other among the eight first regions 23 and the eight second regions 25, is usable for the cutting process of the workpiece.

Here, the intersection of the upper surface 3 and the side surface 7 does not have a strict linear shape formed by two intersecting surfaces. The durability of the cutting edge 9 can deteriorate when the intersection of the upper surface 3 and the side surface 7 is sharpened at an acute angle. Therefore, a so-called horning process may be carried out so that a region where the upper surface 3 and the side surface 7 intersect with each other has a slight curved surface shape.

The cutting insert 1 of the present embodiment has a so-called positive type configuration that the cutting edge 9 is formed only along the intersection of the upper surface 3 and the side surface 7, and the side surface 7 is inclined with respect to the upper surface 3 and the lower surface 5. The cutting insert 1 is not limited to this embodiment.

The cutting insert 1 may has a so-called negative type configuration that the side surface 7 is perpendicular to the upper surface 3 and the lower surface 5, and the cutting edge 9 is also formed along the intersection of the lower surface 5 and the side surface 7 in addition to the intersection of the upper surface 3 and the side surface 7. In the cutting insert 1 of the negative type, similarly to the upper surface 3, the lower surface 5 may also be configured to have the land surface, the rake surface, and the bottom surface.

<Cutting Tool>

A cutting tool 101 according to an embodiment of the present invention is described below with reference to the drawings.

Figure 13:
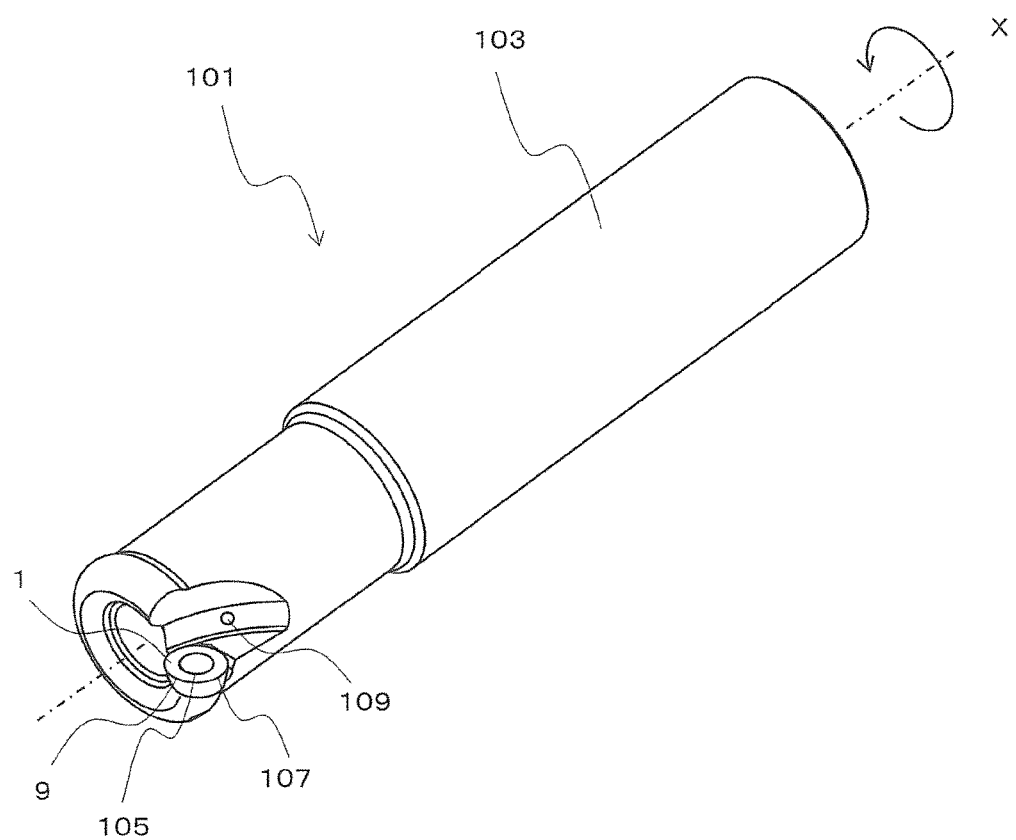
FIG. 13 is a perspective view showing a cutting tool according to an embodiment of the present invention.

As shown in FIG. 13, the cutting tool 101 of the present embodiment has a holder 103 that has a rotation center axis Y and has a plurality of insert pockets 107 on the front end side of the outer periphery of the holder 103, and the foregoing cutting inserts 1 to be respectively attached to the insert pockets 107.

The holder 103 has an approximately rotary body shape to be rotated around the rotation center axis Y. The insert pockets 107 are disposed at regular intervals along the outer peripheral surface on the front end side of the holder 103. The insert pockets 107 are configured to attach the cutting insert 1 thereto and communicate with the outer peripheral surface and a front end surface of the holder 103. Specifically, each of the insert pockets 107 has a seating surface opposed to each other in a rotational direction, and a plurality of constraining side surfaces located in a direction in which the seating surface intersect with each other. These seating surfaces and constraining side surfaces are brought into contact with the cutting insert 1.

The cutting insert 1 is to be attached to each of the plurality of insert pockets 107 disposed on the holder 103. The plurality of cutting inserts 1 are to be attached so that the cutting edge 9 projects outwardly from the outer peripheral surface, namely, projects sidewardly of the holder 103. Specifically, the plurality of cutting inserts 1 are to be attached to the holder 103 so that a part of the cutting edge 9 projects from the outer peripheral surface of the holder 103.

According to the present embodiment, each of the cutting inserts 1 is attached to the insert pocket 107 by a screw 105. That is, the cutting insert 1 is fixed to the holder 103 by inserting the screw 105 into the through hole of the cutting insert 1, and by inserting the front end of the screw 105 into a screw hole (not shown) disposed in the insert pocket 107 so as to screw together screw portions.

According to the present embodiment, the cutting insert 1 is attached to the holder 103 so that the cutting edge 9 projecting outward from the outer peripheral surface has a positive axial rake angle and a negative radial rake angle. Although the radial rake angle is negative in the present embodiment, it may also be positive depending on machining conditions.

The holder 103 has a hole 109 penetrating from a rear end surface of the holder 103 to an outer peripheral surface of the front end side thereof. The hole 109 opens to a portion of the outer peripheral surface on the front end side which is close to the insert pocket 107. A cooling fluid is to be supplied from the exterior through the hole 109 to the cutting insert 1. The cooling fluid ensures efficient release of heat generated during the cutting process.

Steel, cast iron, or the like is usable for the holder 103. Among others, high-rigidity steel is preferably used.

<Method of Producing Machined Product>

A method of producing a machined product according to an embodiment of the present invention is described below with reference to the drawings.

The machined product is produced by subjecting a workpiece to a cutting process. The method of producing the machined product according to the present embodiment has the following steps:

(1) rotating the cutting tool 101 as represented by the foregoing embodiment;
(2) bringing the cutting edge 9 of the cutting tool 101 being rotated into contact with the workpiece 201; and
(3) separating the cutting tool 101 from the workpiece 201.

Figure 14:
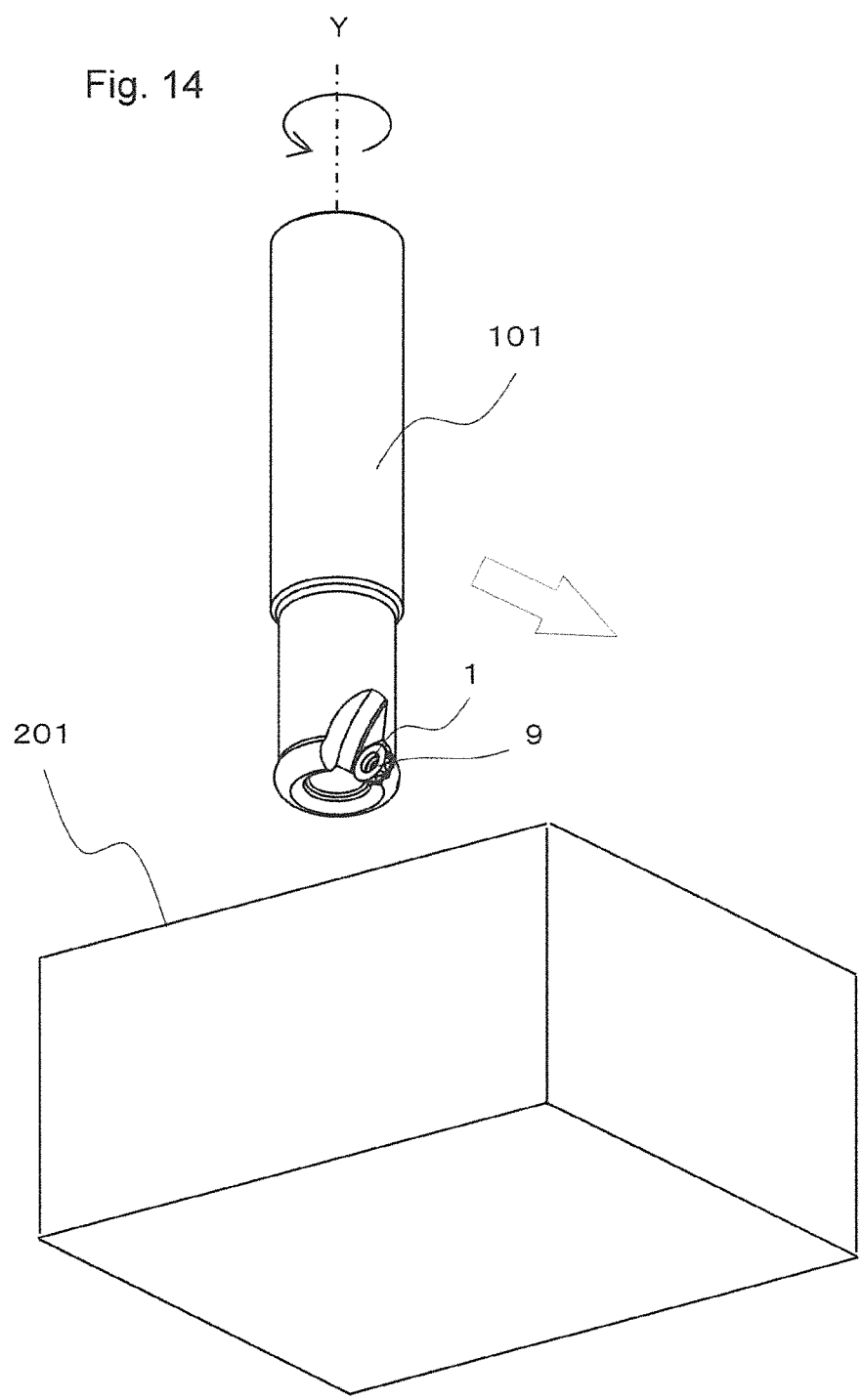
FIG. 14 is a perspective view showing a step of a method of producing a machined product according to an embodiment of the present invention.
Figure 15:
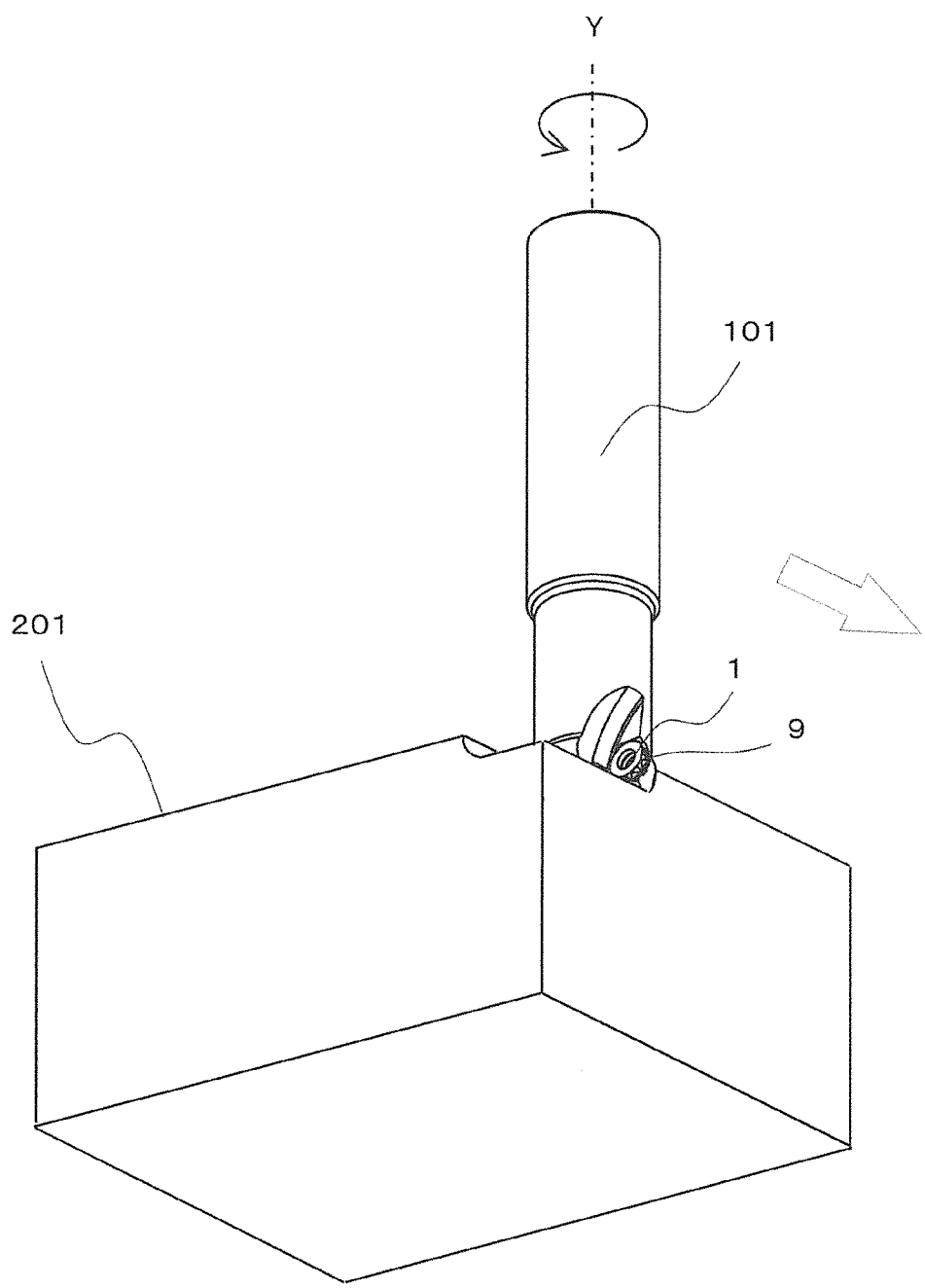
FIG. 15 is a perspective view showing a step of the method of producing a machined product according to the embodiment of the present invention.
Figure 16:
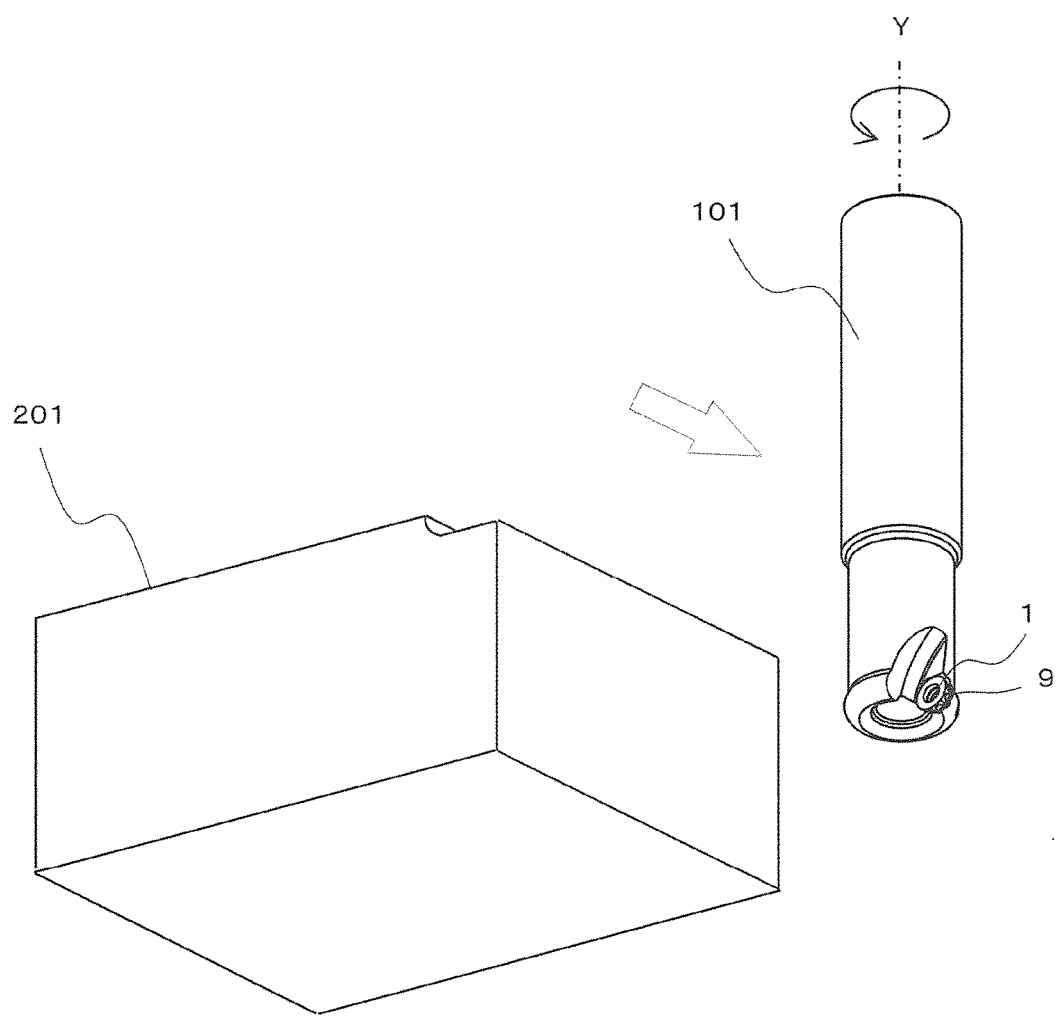
FIG. 16 is a perspective view showing a step of the method of producing a machined product according to the embodiment of the present invention.

More specifically, firstly, the cutting tool 101 is relatively brought near the workpiece 201 while rotating the cutting tool 101. Subsequently, the cutting edge 9 of the cutting tool 101 is brought into contact with the workpiece 201 so as to cut the workpiece 201 as shown in FIGS. 14 and 15. Thereafter, the cutting tool 101 is kept relatively away from the workpiece 201 as shown in FIG. 16.

In the present embodiment, the workpiece 201 is fixed and the cutting tool 101 is brought near the workpiece 201. In FIGS. 14 and 15, the workpiece 201 is fixed and the cutting tool 101 is rotated. In FIG. 16, the workpiece 201 is fixed and the cutting tool 201 is separated from the workpiece 201. The workpiece 201 is fixed and the cutting tool 101 is moved in each of the steps in the cutting process according to the producing method of the present embodiment. This embodiment is illustrated by way of example and without limitation.

For example, in the step (1), the workpiece 201 may be brought near the cutting tool 101. In the step (3), the workpiece 201 may be separated from the cutting tool 101. When the cutting process is continued, it is required to repeat the step of bringing the cutting edge 9 of the cutting insert 1 into contact with different portions of the workpiece 201 while the cutting tool 101 is kept rotating. When the cutting edge 9 in use is worn, an area of the cutting edge 9 which is not used yet may be used by turning the cutting insert 1 with respect to the central axis X of the through hole 11.

Representative examples of the material of the workpiece 201 include carbon steel, alloy steel, stainless steel, cast iron, and nonferrous metals.

DESCRIPTION OF THE REFERENCE NUMERAL

1: cutting insert
3: upper surface
5: lower surface
7: side surface
9: cutting edge
11: through hole
13: land surface
15: rake surface
17: bottom surface
19: first rake surface
21: second rake surface
23: first region
25: second region
27: first recess
29: second recess
101: cutting tool
103: holder
105: screw
107: insert pocket
109: hole
201: workplace

The invention claimed is:

1. A cutting insert, comprising:
an upper surface;
a lower surface;
a side surface connected to each of the upper surface and the lower surface; and
a cutting edge located along an intersection of the upper surface and the side surface,
wherein the upper surface comprises a land surface disposed along the cutting edge, a rake surface which is located further inside than the land surface and is inclined so as to have a smaller height from the lower surface as departing from the land surface, and a bottom surface located further inside than the rake surface,
wherein the rake surface comprises a plurality of first regions and a plurality of second regions which are alternately disposed along the bottom surface,
wherein the plurality of second regions have a larger inclination angle than the plurality of first regions and are concave areas on the rake surface, and
wherein the first region comprises a first recess extended along the cutting edge, and
wherein the first recess reaches each of a pair of the second regions adjacent to the first region.

2. A cutting insert, comprising:
an upper surface;
a lower surface;
a side surface connected to each of the upper surface and the lower surface; and
a cutting edge located along an intersection of the upper surface and the side surface,
wherein the upper surface comprises a land surface disposed along the cutting edge, a rake surface which is located further inside than the land surface and is inclined so as to have a smaller height from the lower surface as departing from the land surface, and a bottom surface located further inside than the rake surface,
wherein the rake surface comprises a plurality of first regions and a plurality of second regions which are alternately disposed along the bottom surface,
wherein the plurality of second regions have a larger inclination angle than the plurality of first regions and are concave areas on the rake surface,
wherein the first region comprises a first recess extended along the cutting edge, and
wherein the first region comprises a second recess which is connected to the first recess and is located between the land surface and the first recess.

3. The cutting insert according to claim 2, wherein the second recess has a larger width as going from the first recess to the land surface.

4. The cutting insert according to claim 2, wherein the first region comprises a plurality of the second recesses.

5. The cutting insert according to claim 2, wherein the second recess is away from the land surface.

6. A cutting tool, comprising:
a holder having a plurality of insert pockets on a front end side of an outer periphery of the holder; and a cutting insert according to claim 1 to be attached to the insert pockets so that the cutting edge projects sidewardly of the holder.

7. A method of producing a machined product, comprising:
rotating a cutting tool according to claim 6;
bringing the cutting edge of the cutting tool being rotated into contact with a workpiece; and
separating the cutting tool from the workpiece.

\* \* \* \* \*